United States Patent [19]

Sunesson

[11] 4,199,182
[45] Apr. 22, 1980

[54] DEVICE ARRANGED TO TIGHTEN AND TO LOCK SLINGS OR LOAD-FASTENING BELTS

[75] Inventor: Sigvard B. Sunesson, Angered, Sweden

[73] Assignee: Goteborgs Bandväveri AB, Angered, Sweden

[21] Appl. No.: 951,084

[22] Filed: Oct. 13, 1978

[30] Foreign Application Priority Data

Oct. 31, 1977 [SE] Sweden .................. 7712242

[51] Int. Cl.² .............................................. B66F 3/00
[52] U.S. Cl. ...................... 254/79; 254/164; 294/74; 24/68 CD
[58] Field of Search ............... 294/74, 75; 24/68 CD, 24/69 CT, 71 ST; 254/55, 68, 79, 164

[56] References Cited

U.S. PATENT DOCUMENTS 2,889,136   6/1959   Prete, Jr. .................. 254/79
4,154,427   5/1979   Hofmann .................. 254/79

Primary Examiner—James B. Marbert
Attorney, Agent, or Firm—Toren, McGeady and Stanger

[57] ABSTRACT

A two-arm tensioning device is used to tighten and to lock load-fastening belts. The arms are pivotally mounted about a reel drum on which are mounted toothed discs which turn with the drum. Upon pivoting of the first arm the belt is wound onto the reel drum by the engagement of a first catch on the first arm with the teeth of the discs. A second catch on the second arm is provided to prevent, through its engagement with the disc teeth, turning movement of the drum in the opposite direction. The second arm includes a locking member arranged to releasably engage the first catch to prevent unintentional pivoting of the first arm after tightening of the belt. A special safety catch in the form of a projection is provided on the first arm to releasably retain the second catch in engagement with the disc teeth.

2 Claims, 4 Drawing Figures

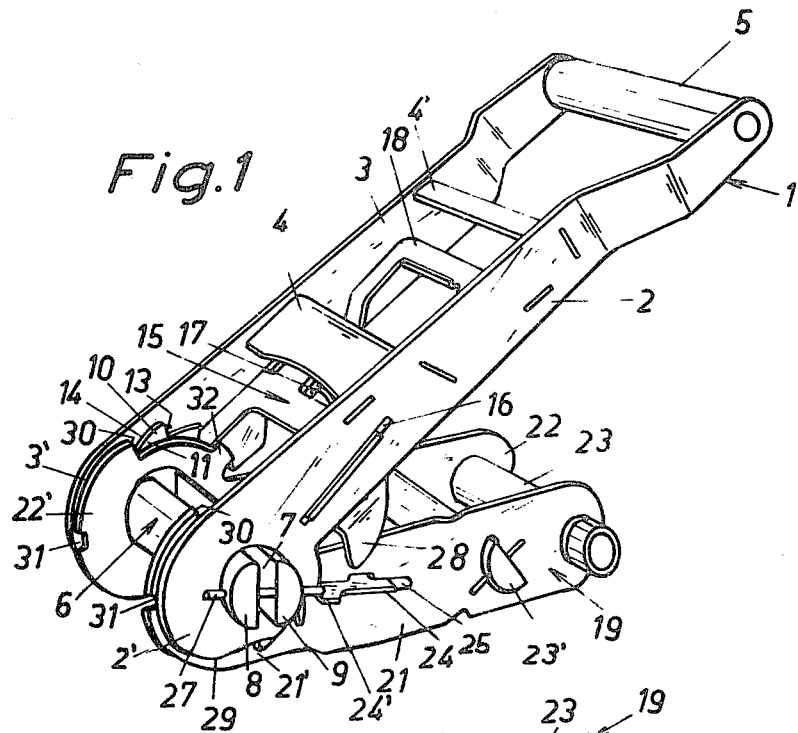
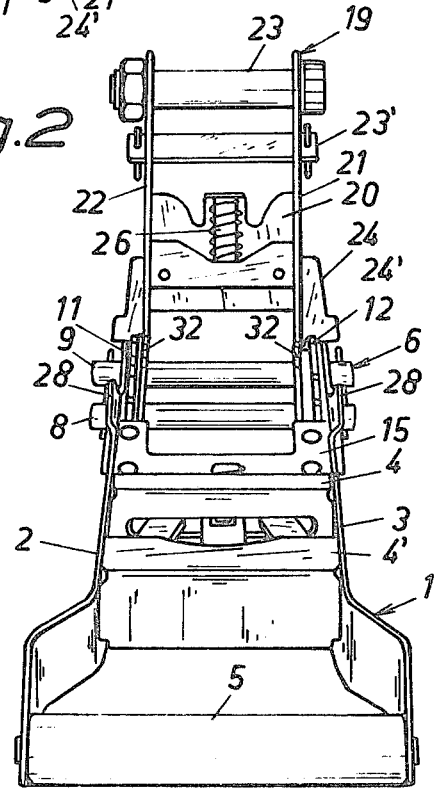

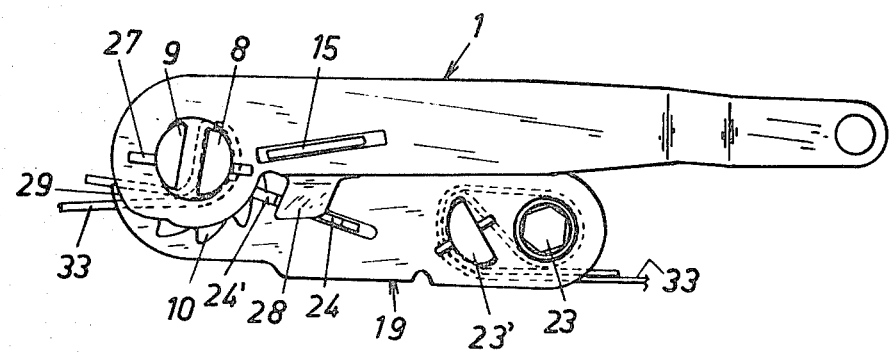
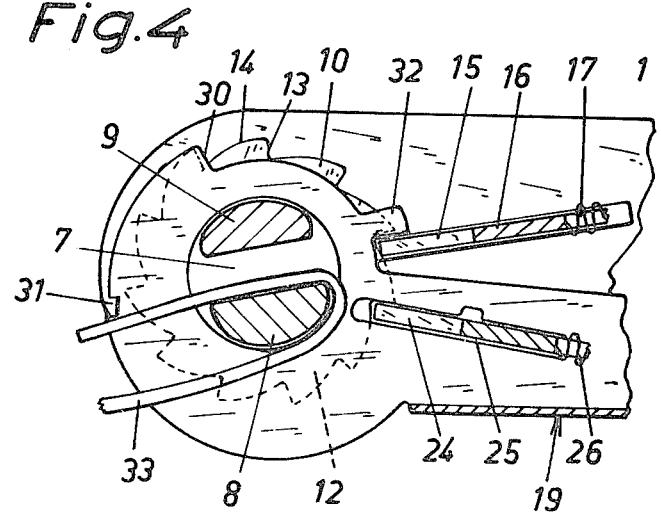

DEVICE ARRANGED TO TIGHTEN AND TO LOCK SLINGS OR LOAD-FASTENING BELTS

BACKGROUND OF THE INVENTION

The present invention concerns an arrangement in a device designed to tighten and to lock slings or load-fastening belts, which device comprises a reel drum on which the belt is wound, one or several discs or similar means which are mounted on the drum so as to rotate therewith and which are provided with peripheral teeth, said teeth comprising a first, radially extending tooth face and a second tooth face which is inclined or curved relative to the radius, a first operating arm which is mounted on the drum and pivotable between a first and is a second end position and on which arm is provided a first catch means which is arranged in guide means, said first catch means being spring-loaded in order to be urged into engagement between the disc teeth, and arranged to be displaced out of engagement with said teeth, a second arm one of the ends of which is mounted on the drum and on which arm is provided a second catch means, arranged in guide means, which second catch means is spring-loaded in order to engage the disc teeth, the arrangement being such that the first catch means, upon pivotal movement of the operating arm to wind the belt onto the reel drum, is brought into engagement with the radial tooth face, thus effecting turning of the reel drum, and such that the second catch means slides on the inclined or curved tooth face of the disc teeth and, when it moves past a tooth, snaps down behind the radial face thereof, thus preventing the toothed discs and the drum from being turned in the opposite direction, said operating arm being arranged, after having been pivoted to its opposite extreme position for the purpose of effecting continued winding-on of the belt, to be first re-set to its first end position, wherein said first catch means is arranged to slide over the inclined or curved tooth faces of the teeth, while at the same time the drum and the toothed discs are retained in position by the second catch means and, in order to release the drum, said operating arm is arranged, upon disengagement of said first catch means against the action of the spring bias, to be pivoted past its second end position above a stop member on the second arm, whereby said second catch means, upon pivotal movement of the operating arm past said stop member, is arranged to slide along a guide face on said operating arm and against the action of the spring bias to be forced out of engagement with the teeth to a position wherein said operating arm may be locked by the engagement of said first catch means in a groove or similar means on the second arm.

Devices of this kind are often used to secure and tighten slings or load-fastening belts around vehicle loads. With the aid of such devices it is possible to tighten the load-fastening belts securely.

Hitherto known devices of this kind do, however, suffer from certain drawbacks. While the vehicle is being driven the operating arm may, on account of its inertia, swing outwards away from the load on curves or in braking situations. A projecting arm is a considerable safety risk in traffic as it could easily hit or catch other vehicles or in persons.

SUMMARY OF THE INVENTION

The purpose of the subject invention is to provide a locking means by means of which the operating arm may be secured and locked after tightening of the load-fastening belt.

The invention is characterised in that a projecting locking member is provided on the second arm and in that the operating arm is arranged to be pivoted into a locked position internally of its first end position, in which locked position the first catch means of said operating arm catches behind said locking member, said locking member is arranged to prevent the operating arm from being pivoted outwards from its locked position, whereby said operating arm may be pivoted from this locked position past said locking member only after said first catch means has been actuated out of its position of engagement.

Tightening and retaining devices of this kind which secure and retain the load on vehicles must meet exceptionally severe safety demands. Under no circumstances must the tightened load-fastening belt come loose in the tightening device.

It is already known to give to the second catch means which retains the tightened load-fastening belt in position, sufficient dimensions to ensure that it may withstand strong and lengthy stresses.

In a preferred embodiment, the device in accordance with the invention is provided with a particular safety catch preventing disengagement of the second catch means also if the spring acting on said second catch means should break.

For this purpose the device in accordance with the invention is characterised in that the operating arm is provided with projections arranged, in the locked position of the operating arm, to engage behind a portion of the second catch means, thus preventing the latter from being moved out of its position of engagement between the teeth, when the operating arm is in its locked position.

BRIEF DESCRIPTION OF THE DRAWINGS

The invention will be described in closer detail in the following with reference to one embodiment thereof illustrated in the accompanying drawings, wherein FIG. 1 is a perspective view from the side, illustrating the device in accordance with the invention, FIG. 2 is a perspective view from above of the device in accordance with FIG. 1 with the operating arm in its outer position, FIG. 3 illustrates the device in accordance with the invention in a lateral view with the operating arm shown in its locked position, and FIG. 4 illustrates on an enlarged scale a partly broken longitudinal section of the device as seen from the center line thereof.

DETAILED DESCRIPTION OF A PREFERRED EMBODIMENT

The device in accordance with the invention comprises an operating arm 1 consisting of two laterally spaced apart legs 2, 3. The legs are interconnected by means of stays 4, 4' and by a handle 5. The operating arm 1 is pivotally mounted on a reel drum 6 and consists of two halves 8, 9 positioned some distance apart to form between them an intermediate gap 7.

Internally of the legs 2, 3, are are mounted on the drum 6 are two toothed discs 11, 12 having peripheral teeth 10 thereon and which discs are formed with openings matching the drum halves 8, 9 and which are arranged to rotate together with the drum. Each tooth 10 is formed with a radially extending tooth face 13 and with a second tooth face 14 which is inclined relative to the radius of the toothed disc.

A first catch means 15 is arranged in guide means 16 formed in the operating arm 1. A spring 17 is held between the stay 4 and the catch means 15 to bias the catch means into engagement between the teeth 10. The catch means 15 is provided with a handle 18 by means of which it may be actuated.

The device also includes a second arm 19 consisting of two legs 21, 22 which are interconnected by a stay 20. Between one of the ends of the legs extends a bolt 23 and inwardly adjacent thereof a semi-cylindrically shaped bolt 23'. The legs are mounted on the drum 6 internally of the toothed discs and are provided with through-passage holes therefor in which the drum is freely rotatable.

A second catch means 24 is provided in guide means 25 and is spring-loaded by a spring 26. The latter is held between the stay 20 and the catch means 24 and is arranged to bias the latter into engagement between the teeth 10.

A cotter pin 27 is arranged so as to penetrate all through the two drum halves 8, 9 on the outer faces of the legs 2, 3 of the operating arm. The operating arm legs are further provided with positions 28 projecting therefrom and on their mounting portions 2', 3', they are provided with guide faces 29 for the catch means 24.

On their mounting parts 21', 22' the legs 21, 22 of the second arm are provided with a stop member 30 cooperating with the first catch means 15, a notch 31 cooperating with the catch means 15 and with a projecting locking member 32 (FIG. 4) also cooperating with the catch means 15.

In FIGS. 3 and 4, the load-fastening belt or sling is designated by numeral 33.

Upon application of a sling 33 around a load the one end part of the sling is secured by first arranging it over the bolts 23 and 23' and then passing it in between said bolts and above the bolt 23, in the manner appearing from FIG. 3. The opposite end part of the sling is arranged on the drum after the sling having been positioned in a loop about the load. As appears from FIGS. 3 and 4 the latter end part is passed through the gap 7 between the drum halves. The sling or belt is then wound onto the drum by pivoting the operating arm 1 repeatedly outwards. When the latter is pivoted for the purpose of winding-on the sling 33, the first catch means 15 is brought into engagement with the radial tooth face 13 of one of the teeth 10, with the result that the turning movement of the drum 6 is started. The second catch means simultaneously slides on the inclined face 14 of the teeth 10 and upon passing the respective one of the teeth it snaps down behind the radial catch face thereof and this prevents the toothed discs and the drum from turning in the opposite direction.

The pivotal movement of the operating arm 1 is limited to less than one revolution between its first end position and its second end position, the first end position being the position wherein the first catch means 15 is positioned immediately externally of the locking member 32 and the second end position being the position, wherein the first catch means abuts against the stop member 30.

After completion of the pivotal movement of the operating arm to its second end position it is necessary to first return the arm to the first end position thereof before it is possible to wind a further length of the sling onto the drum. To effect this, the first catch means 15 slides over the inclining tooth faces 14 of the teeth while the drum 6 and the toothed discs 11, 12 are maintained in position by the second catch means 24.

When the first catch means 15 has been actuated out of engagement against the action of the spring bias, it is possible to pivot the operating arm 1 past its second end position above the stop member 30. The second catch means 24 then slides along the guide face 29 on the mounting parts 2', 3' of the legs 2, 3 and against the action of the spring 26 it is forced out of its engagement with the teeth 10. The operating arm 1 is now swung to a position wherein it may be locked by the engagement of the first catch means 15 in the notch 31 and wherein the drum is freely rotatable. In this position of the operating arm 1 it is consequently possible to loosen the load-fastening belt.

After disengagement of the first catch means 15, the operating arm 1 may be pivoted internally of the first end position to a locking position wherein the catch means 15 is displaced above the projecting locking member 32. When the catch means is released, it is urged into a locking position behind the locking member 32. This position of the operating arm is shown in FIG. 4.

The locking member 32 serves as safety catch. When the operating arm 1 is in the locked position, the arm cannot be pivoted outwards until the first catch means 15 has been pulled out sufficiently for its end to go clear of the locking member.

The portions 28 projecting from the legs 2, 3 of the operating arm 1 are arranged, in the locked position of the operating arm 1 (see FIG. 3), to catch behind parts 24' of the second catch means 24, which parts 24' extend outwards through the guide slots 25 formed in the second arm 19. Consequently, the second catch means 24 cannot be brought out of its position of engagement between the teeth as long as the operating arm is in its locked position.

The invention is not limited to the embodiment described above but a number of modifications are possible within the scope of the appended claims.

I claim:
1. An improved device for tightening and locking belts, such as slings, load-fastening belts and the like, comprising
   a reel drum on which said belt is wound,
   a number of disc-like members on said drum so as to rotate therewith, said disc-like members provided with peripheral teeth,
   a first, radially extending tooth face on each one of said teeth, and a second face on each one of said teeth, said second face being inclined relative to and extending transversely of the disc-like member radius,
   a first operating arm mounted on said drum and pivotable between a first and a second end position, a first catch means on said arm, guide means in said operating arm, said first catch means arranged in said guide means, said first catch means being spring-loaded in order to be urged into engagement between said disc-like member teeth, and arranged to be displaced out of engagement with said teeth, a second arm having one end thereof mounted on said drum, a second catch means provided on said second arm, guide means in said second arm, said second catch means arranged in said guide means and being spring-loaded in order to engage said disc-like member teeth, the arrangement being such that said first catch mean, upon pivotal movement of said operating arm from the first toward the second end position to wind said belt onto said reel drum, is brought into engagemeent with one said radial first tooth face, thus effecting turning of said reel drum, and such that said second catch means slides on said inclined second tooth faces of said disc-like member teeth and, upon its movement past one of said teeth, snaps down behind the radial first face of said tooth, thus preventing said toothed disc-like members from being turned in the opposite direction, said first operating arm being arranged, after having been pivoted to its opposite second end position for the purpose of effecting continued winding-on of said belt, to be first re-set to its first end position, wherein said first catch means is arranged to slide over said inclined tooth faces of said teeth, while at the same time said drum and said toothed disc-like members are retained in position by said second catch means and, in order to release said drum, said operating arm is arranged, upon the disengagement of said first catch means against the action of said spring bias, to be pivoted past its second end position past a stop member on said second arm, whereby said second catch means, upon the pivotal movement of said operating arm past said stop member, is arranged to slide along a guide face on said operating arm and, against the action of said spring bias, to be forced out of its engagement with said disc-like member teeth to a position, wherein said operating arm may be locked by the engagement of said first catch means in a groove means on said second arm, the improvement comprising a projecting locking member on the one end of said second arm, said first operating arm arranged to be pivoted in the direction opposite to the direction from the first to the second position thereof into a locked position past its first end position, in which locked position said first catch means of said first operating arm catches behind said locking member, said locking member arranged to prevent said operating arm from being pivoted from its locked position, whereby said operating arm may be pivoted from said locked position past said locking member only after actuation of said first catch means against the spring-loaded action of said first catch means so as to move the latter out of its position of engagement.

2. An improved device according to claim 1, comprising a projection on said first operating arm, a portion of said second catch means extending laterally from said second arm, said projection on said first operating arm engaging said second catch means portion in the locked position of said first operating arm for preventing said second catch means from being moved out of the position of engagement between said disc-like member teeth when said first operating arm is in its locked position.

* * * * *